R. Montgomery.
Sheet Metal Beam.
No. 2,668. Reissued Jul. 2, 1867.
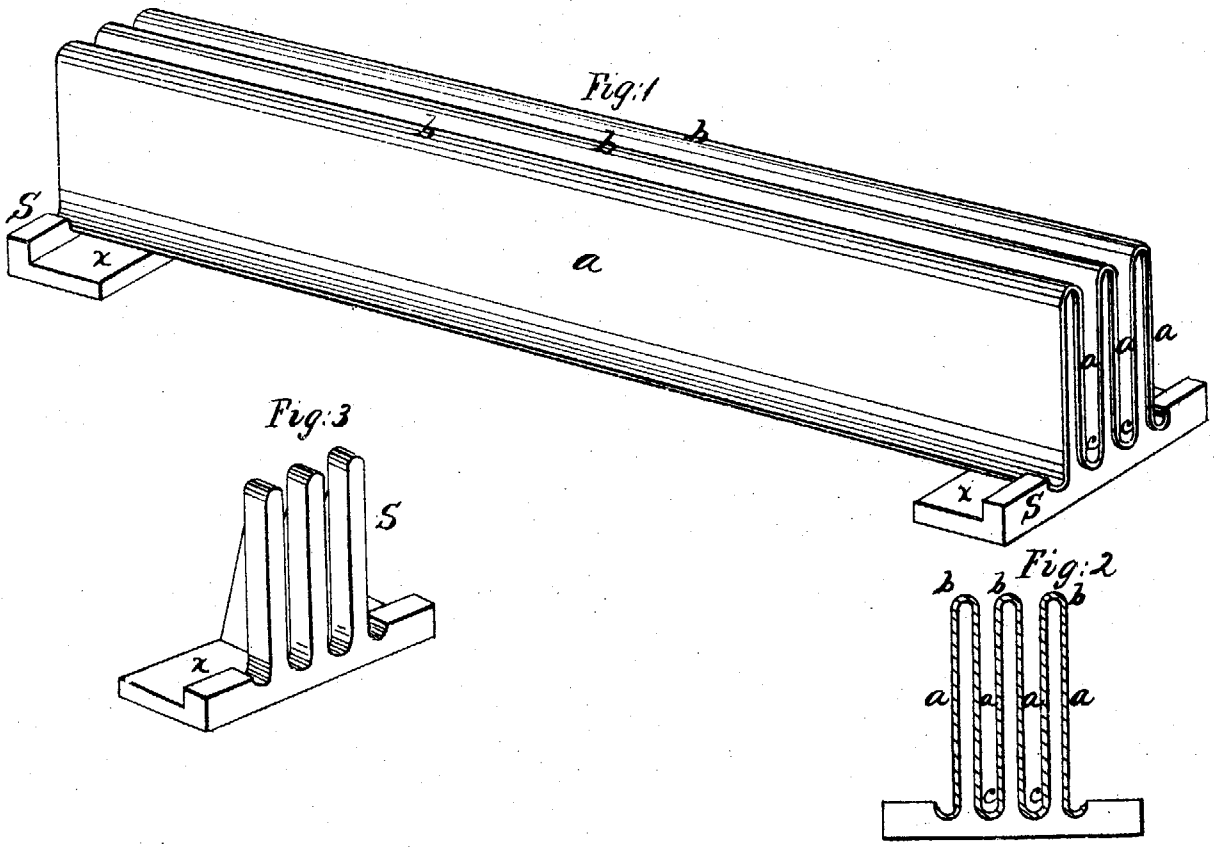

United States Patent Office.

RICHARD MONTGOMERY, OF NEW YORK, N. Y.

*Letters Patent No.* 9,842, *dated July* 12, 1853; *reissue No.* 2,668, *dated July* 2, 1867.

IMPROVED SHEET-METAL BEAM

The Schedule referred to in these Letters Patent and making part of the same.

TO ALL WHOM IT MAY CONCERN:

Be it known that I, RICHARD MONTGOMERY, of the city, county, and State of New York, have invented a new and useful improvement in Sheet-Metal Beams for supporting weights and resisting strains in bridges, houses, ships, and other structures, of which the following is a full and exact description, sufficient to enable others skilled in the art to which it appertains to understand and use the same, reference being had to the accompanying drawings making part of this specification, in which—

Figure 1 represents a perspective view of my improved beam, made of a single plate.

Figure 2 is a transverse section of the same.

Figure 3 is a perspective view of a saddle for the support of the ends of the beam.

Similar letters of reference indicate corresponding parts in the several figures.

The object of my invention is to produce metallic beams of greater lightness and strength, and at less cost than has hitherto been done, and I effect this object by bending sheet metal, which possesses great tensile strength, into such a form as will give it the proper proportions, rigidity, and transverse strength to admit of its use as a beam for resisting great weight or strains.

It is well known that if beams be properly secured against twisting or buckling, all other things being equal, those will possess the greatest amount of transverse strength, or support the greatest weight without liability to fracture, which present the greatest depth of material in the line of pressure. By applying the test to my beam it will be seen that it possesses greater transverse strength and stiffness than any other beam of equal weight formed of sheet metal by bending the same into folds.

My beam is constructed by bending a sheet of metal into a series of longitudinal strips, which are alternately arched and flat, the arches being alternately inverted, the flat strips being arranged vertically parallel, and equidistant as nearly as practical, and each connected to the adjacent flat strip by an inverted arch at the bottom on the one hand, and by an uninverted arch at the top on the other hand; the arches terminating in the parallel strip and acting as flanges to give them lateral stiffness; and the arches are flat strips, together constituting a series of folds of the sheet metal which run lengthwise of the beam. In a beam thus constructed, the great depth of the parallel plates which form the side of the folds L, is rendered available to support a weight or resist strains, and as each plate is a rectangular beam of great depth compared to its thickness, and as rectangular beams resist fracture by a force proportionate to the square of their depth, I produce a beam of immense strength, with but little weight of material.

In the accompanying drawing one of my beams is made of a single sheet of metal bent into four vertical flat strips *a*, three uninverted arches *b*, and four inverted arches *c*, the flat strip and arches all running lengthwise of the beam. The span and height of the arches, and the depth and number of the folds in the series, and the manufacture of the beam by swaging, rolling, or otherwise, are matters which must be left to the judgment of the engineer who superintends the construction. The ends of the beam thus constructed require a firm and stable support at both ends, and in order more effectually to insure such a support I have contrived a saddle, S, which fits the under side of the beam, and having a broad, flat base, *x*, and is adapted to being built into or stand firmly on the wall. When this beam is employed in ship-building, it may be riveted or otherwise secured to the knees or ribs, so that advantage may be taken of its tensile strength as well as its stiffness.

I am aware that plates of metal for roofing and steam boilers have been bent into a wavy form by a process commonly termed corrugation, for the purpose of stiffening them; but in every such case the series of folds is comparatively shallow, and instead of the strips between the arches being parallel and in the plane of pressure, they are inclined to each other, and stand obliquely across the plane of pressure, in which position they would break down with a load that they could easily support if placed vertical and parallel, as in my beam; and to a plate with such inclined strips I therefore make no claim, as it is not suitable for a beam; but what I do claim as my invention, and desire to secure by Letters Patent, is—

A beam formed of sheet metal, bent into a series of longitudinal folds, the sides of which are flat and parallel, and the tops and bottoms uninverted and inverted arches respectively.

I also claim the combination with such beam of a pair of saddles to support its ends, substantially as herein set forth.

To the above I have signed my name this 8th day of June, 1867.

RICHARD MONTGOMERY.

Witnesses:

J. J. COOMBS,

JOS. L. COOMBS.